(12) United States Patent
Ha et al.

(10) Patent No.: US 7,538,516 B2
(45) Date of Patent: May 26, 2009

(54) SEPARABLE CONNECTING MEMBER FOR SECONDARY BATTERY MODULE AND METHOD OF IMPROVING THE PERFORMANCE OF BATTERY MODULE BY LEVELING VOLTAGE

(75) Inventors: Jin Woong Ha, Cheonan-si (KR); Jeeho Kim, Daejeon (KR); HanHo Lee, Daejeon (KR)

(73) Assignee: LG Chem, Ltd. (KR)

( * ) Notice: Subject to any disclaimer, the term of this patent is extended or adjusted under 35 U.S.C. 154(b) by 493 days.

(21) Appl. No.: 11/317,310

(22) Filed: Dec. 23, 2005

(65) Prior Publication Data
US 2006/0170394 A1 Aug. 3, 2006

(30) Foreign Application Priority Data
Dec. 24, 2004 (KR) .................. 10-2004-0112594
May 10, 2005 (KR) .................. 10-2005-0038688

(51) Int. Cl.
*H01M 10/46* (2006.01)

(52) U.S. Cl. ........................................ 320/107

(58) Field of Classification Search ............... 320/107, 320/111, 112, 116, 118, 119
See application file for complete search history.

(56) References Cited

U.S. PATENT DOCUMENTS 6,175,214 B1 * 1/2001 Mendoza et al. ............ 320/116
6,771,045 B1 * 8/2004 Keller ........................ 320/118

* cited by examiner

*Primary Examiner*—Edward Tso
(74) *Attorney, Agent, or Firm*—Cantor Colburn LLP

(57) ABSTRACT

Disclosed herein is a separation-type connecting member, which electrically connects electrode terminals of unit cells. The connecting member comprises two or more separated connecting bodies, which are connected to the corresponding electrode terminals during the assembly of a secondary battery module, and which are electrically connected with each other by additional conductive members to complete the battery module. The present invention also provides a method of improving the performance of a battery module that is capable of connecting unit cells in parallel with each other to level the voltage of the unit cells while the battery module is manufactured using the connecting member, specifically, before the unit cells are connected in series with each other, or while the battery module is used, thereby minimizing the voltage difference between the unit cells.

10 Claims, 9 Drawing Sheets

400

SEPARABLE CONNECTING MEMBER FOR SECONDARY BATTERY MODULE AND METHOD OF IMPROVING THE PERFORMANCE OF BATTERY MODULE BY LEVELING VOLTAGE

FIELD OF THE INVENTION

The present invention relates to a connecting member used to electrically connect electrode terminals of unit cells in a high-output, large-capacity secondary battery module or pack and a method of improving the performance of a battery module by leveling voltage.

More particularly, the present invention relates to a separation-type connecting member, which electrically connects electrode terminals of unit cells, comprising two or more separated connecting bodies, which are connected to the corresponding electrode terminals during the assembly of a secondary battery module, and which are electrically connected with each other by additional conductive members to complete the battery module, and a method of improving the performance of a battery module that is capable of connecting unit cells in parallel with each other to level the voltage of the unit cells while the battery module is manufactured using the connecting member, specifically, before the unit cells are connected in series with each other, or while the battery module is used, thereby minimizing the voltage difference between the unit cells.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution caused by existing gasoline and diesel vehicles using fossil fuel. As a result, applications using the secondary battery are being increased owing to advantages thereof, and the secondary battery is expected to be applied to more applications and products.

Secondary batteries have different structures depending upon outputs and capacities required by applications and products, to which the secondary batteries are applied. For example, small-sized mobile devices, such as mobile phones, personal digital assistants (PDAs), digital cameras, and laptop computers, use small-sized light cells for reduction in the size and weight of the corresponding products. On the other hand, medium- or large-sized devices, such as electric bicycles, electric motorcycles, electric vehicles, and hybrid electric vehicles, use a medium- or large-sized battery module (or medium- or large-sized battery pack) having a plurality of cells electrically connected with each other because high output and large capacity are necessary for the medium- or large-sized devices. The size and weight of the battery module is directly related to the receiving space and output of the corresponding medium- or large-sized device. For this reason, manufacturers are trying to manufacture small-sized light battery modules.

Generally, a medium- or large-sized secondary battery module is manufactured by mounting a plurality of unit cells in a case (housing) having a predetermined size and electrically connecting the unit cells. A rectangular secondary cell or a pouch-shaped secondary cell, which can be stacked with high integration, is normally used as the unit cell. Preferably, the pouch-shaped cell is used as the unit cell since the pouch-shaped cell is light and inexpensive.

The secondary battery module is manufactured by electrically connecting the plurality of unit cells with each other. Especially, all or some of the unit cells are connected in series with each other to provide high output. As a result, an engineer may be exposed to a high voltage during the manufacturing of the battery module, and therefore, a great care must be taken for safety in manufacturing of the battery module. Electrical short-circuits during the assembly of the battery module can cause injury to the engineer and reduction in the performance of the unit cells. Consequently, more careful assembly of the battery module is required so as to solve the above-mentioned short-circuit problem, which greatly reduces the productivity of battery modules.

Also, it is necessary to interrupt the operation of the battery module in the abnormal state, for example, when overcurrent or overheating occurs, in order to secure the safety of the battery module. In addition, it is preferable that such interruption of the operation of the battery module be accomplished by module-type members so that the unit cells causing the abnormal operation can be checked and replaced.

Meanwhile, when the unit cells each has the same capacity and voltage, the medium- or large-sized secondary battery module is optimally operated. Although the unit cells have the same capacity and voltage, however, the unit cells may have voltage difference due to the restrictions in manufacturing the unit cells, which are caused by various factors. Also, voltage difference between the unit cells may occur due to several factors during the use of the battery module as well as during the manufacturing of the battery module.

Consequently, there is a high need to minimize the voltage difference between the unit cells, and thus, to optimally maintain the operation of the battery module.

SUMMARY OF THE INVENTION

Accordingly, it is an object of the present invention to solve the above-mentioned problems in the prior arts.

A first object of the present invention is to provide a connecting member used to electrically connect electrode terminals of unit cells that are capable of greatly reducing short circuits and damage to the unit cells during the assembly of a secondary battery module.

A second object of the present invention is to provide a connecting member that allows safety elements to interrupt the operation of unit cells, which can cause the abnormal operation of a battery module, such as overcurrent and overheating, the safety elements being provided for each unit cell to be easily checked and replaced.

A third object of the present invention is to provide a method of manufacturing a medium- or large-sized battery module using the connecting member.

A fourth object of the present invention is to provide a method of improving the performance of a battery module during the assembly or the use of the battery module to thereby optimally operate the battery module.

A fifth object of the present invention is to provide an apparatus that is capable of performing the method of improving the performance of the battery module.

In accordance with one aspect of the present invention, the above and other objects can be accomplished by the provision of a connecting member used to electrically connect electrode terminals of unit cells constituting a secondary battery module with each other, the connecting member comprising: a first terminal connecting body connected to the electrode terminal of one unit cell (a); and a second terminal connecting body connected to the electrode terminal of another unit cell (b), wherein the first terminal connecting body and the second terminal connecting body are separated from each other while the first terminal connecting body and the second terminal connecting body are connected to the corresponding electrode terminals, and the electrical connection between the unit cell (a) and the unit cell (b) is accomplished by coupling a conductive member to the first terminal connecting body and the second terminal connecting body.

According to the present invention, the unit cells are arranged in a predetermined form, for example, the unit cells are stacked, during the manufacture of the secondary battery module, the terminal connecting bodies of the connecting member are connected to the corresponding unit cells, and then other components of the battery module are assembled and coupled. Subsequently, the unit cells are electrically connected with each other by conductive members at the later or final step of the battery module manufacturing process. Consequently, a risk of electrical short circuits of the unit cells during the assembly of the battery module is greatly reduced. Also, when each of the conductive members is a fuse, a bimetal, or a positive temperature coefficient (PTC) element, the electrical connection between the terminal connecting bodies is accomplished by the above-specified safety elements. Consequently, it is possible to couple the safety elements to the corresponding unit cells and to easily check and replace the unit cells causing the abnormal operation of the battery module. In addition, as will be described hereinafter, the terminal connecting bodies of the connecting member are connected in parallel with each other, before the electric connection of the unit cells by the conductive members, to easily perform voltage leveling, whereby the operation of the battery module is optimized.

The unit cells are not particularly restricted so long as the unit cells are secondary cells which can be charged and discharged. As the unit cells are preferably used lithium secondary cells using lithium transition metal oxide or composite oxide as cathode active material. Also, the shape of the unit cells is not particularly restricted. Preferably, the rectangular cells and the pouch-shaped cells, which can be stacked in high density, are used as the unit cells.

The terminal connecting bodies of the connecting member are not particularly restricted so long as the terminal connecting bodies can be connected to the electrode terminals of the corresponding unit cells while the terminal connecting bodies are separated from each other.

In a preferred embodiment of the present invention, the connecting member further comprises: an insulating member mounted between electrode terminals of the neighboring unit cells for accomplishing the electrical insulation between the electrode terminals, the insulating member being coupled to the electrode terminals, and the first and second terminal connecting bodies of the connecting member are electrically connected to the electrode terminals of the corresponding unit cells while the first and second terminal connecting bodies of the connecting member are coupled to the insulating member. The electrical insulation between the electrode terminals of the unit cells while the unit cells are stacked is guaranteed by the provision of the insulating member. Consequently, a possibility of short circuits is greatly reduced, and the connecting member is easily connected to the electrode terminals.

The insulating member serves to electrically insulate the electrode terminals of the neighboring unit cells from each other. Consequently, the insulating member is made of an electrically insulating material. Preferably, the insulating member is made of various plastic resins, although the insulating member is not particularly restricted so long as the insulating member electrically insulates the electrode terminals of the neighboring unit cells from each other.

The insulating member may be coupled with the electrode terminals of the unit cells in various manners. In a preferred embodiment of the present invention, the electrode terminals of the unit cells are provided with though-holes, and the insulating member is provided with coupling protrusions, which correspond to the through-holes. Consequently, the coupling protrusions of the insulating member are fitted in the though-holes of the electrode terminals, and therefore, the secure coupling between the insulating member and the electrode terminals is accomplished. Preferably, the coupling protrusions are also provided with through-holes, such that the electrode terminals stacked while the insulating member is disposed between the electrode terminals, are further securely coupled with each other by coupling members inserted through the through-holes of the coupling protrusions.

In a preferred embodiment of the present invention, the insulating member is constructed in the shape of a rectangular block, which conforms to a gap between the electrode terminals of the stacked unit cells. The gap between the electrode terminals, while the unit cells are stacked, is provided in the shape of a rectangle. Consequently, the rectangular block conforming to the gap is more stable.

More preferably, the block comprises two assembly unit bodies constructed such that the assembly unit bodies can be coupled with or separated from each other, a cathode terminal of the unit cell being coupled to one of the assembly unit bodies while an anode terminal of the unit cell is coupled to the other assembly unit body. Consequently, the present invention has an advantage in that the connection of the electrode terminals and the coupling of the connecting member are sequentially performed by the provision of the assembly-type insulating member.

The connecting member, which serves to electrically connect the electrode terminals of the unit cells with each other, is made of a conductive material. Preferably, the connecting member is made of metal, although the connecting member is not particularly restricted so long as the connecting member electrically connects the electrode terminals with each other.

The coupling between the connecting member and the insulating member may be accomplished in various manners when the connecting member is coupled to the insulating member and electrically connected to the corresponding electrode terminals. In a preferred embodiment of the present invention, the connecting member comprises: a first terminal connecting body connected to the electrode terminal of one unit cell (a); and a second terminal connecting body connected to the electrode terminal of another unit cell (b) adjacent to the unit cell (a). The first terminal connecting body and the second terminal connecting body of the connecting member is coupled to the insulating member in such a manner that the first terminal connecting body and the second terminal connecting body surround the insulating member, or the first terminal connecting body and the second terminal connecting body are inserted into engaging grooves formed at the insulating member.

For example, the first terminal connecting body and the second terminal connecting body are coupled to the insulating member such that the first and second terminal connecting bodies are connected to the corresponding electrode terminals, and the first terminal connecting body and the second terminal connecting body are connected with each other by a conductive member for accomplishing the electrical connection between the first terminal connecting body and the second terminal connecting body after the first and second terminal connecting bodies are coupled to the insulating member. Preferably, the conductive member is a safety element, such as a fuse, a bimetal, or a positive temperature coefficient (PTC) element.

In accordance with another aspect of the present invention, there is provided a method of manufacturing a secondary battery module using the above-described connecting members. Specifically, the secondary battery module manufacturing method according to the present invention comprises the steps of: (A) mounting unit cells, which can be charged and discharged, in a module case; (B) connecting the terminal connecting bodies of connecting members as set forth in claim 1 to electrode terminals of the unit cells; (C) assembling and coupling other components of the battery module; and (D) coupling conductive members to the terminal connecting bodies to perform the electrical connection between the electrode terminals.

In step (A), the module case may have various structures. As will be described hereinafter, the module case may include upper and lower cases, which can be separated from each other, between which the unit cells are stacked one on another. The electrode terminals may have various orientations. Preferably, the unit cells are stacked such that the electrode terminals of the unit cells are arranged in the same orientation.

When the terminal connecting bodies of connecting members are connected to the electrode terminals in step (B), the insulating member may be mounted as described above, and then the terminal connecting bodies of connecting members are coupled to the insulating member.

Step (C), i.e., the step of assembling and coupling other components of the battery module includes manufacturing the battery module using all or some of the remaining components of the battery module excluding the connecting members. For example, the step of assembling and coupling other components of the battery module may include mounting circuit units for controlling the operation of the battery module. Consequently, the assembly and coupling of some components may be performed after step (D).

Preferably, the secondary battery module manufacturing method further comprises the step of: connecting the terminal connecting bodies of connecting members in parallel with each other, between step (B) and step (C) or between step (C) and step (D), to level the voltage of the unit cells.

The conductive members used in step (D) may be the above-described safety elements. At step (D), the unit cells are electrically connected with each other by the conductive members. In this way, the electrical connection between the unit cells is accomplished at the later or final step of the battery module manufacturing process, and therefore, a possibility of short circuits during the assembly of the battery module is greatly reduced.

In accordance with another aspect of the present invention, there is provided a secondary battery module including the above-described connecting members. An exemplary embodiment of the secondary battery module will be described hereinafter with reference to FIG. 1.

Meanwhile, the inventors have performed various experiments and research, and have found that, when a plurality of unit cells are connected in parallel with each other for a predetermined period of time during the manufacture or the use of a battery module, in which the unit cells are mounted, the voltage difference between the unit cells is minimized, and therefore, the battery module operates optimally.

In accordance with another aspect of the present invention, there is provided a method of improving the performance of a battery module having a plurality of unit cells, comprising the steps of: connecting two or more of the unit cells, which are connected in series with each other, in parallel with each other, for a predetermined period of time during the manufacture or the use of the battery module, to level the voltage of the unit cells, thereby minimizing the voltage difference between the unit cells.

The performance improving method is applied to a medium- or large-sized battery module having two or more unit cells, some or all of which are connected in series with each other to provide high output and large capacity.

The number of the unit cells constituting the battery module may be changed depending upon desired capacity and output of the battery module. The unit cells may be connected in series with each other. Alternatively, the unit cells may be connected in series and parallel with each other.

According to the present invention, at least two of the unit cells, which are connected in series with each other, are contemporarily connected in parallel with each other to level the voltage of the unit cells. Preferably, the voltage of all the unit cells, which are connected in series with each other, is leveled, or the voltage of all the unit cells, which are connected in series and in parallel with each other, is leveled.

The time necessary to perform the parallel connection may be changed depending upon the number, the voltage, the capacity, and the desired leveling value of the voltage. In a preferred embodiment of the present invention, the parallel connection time is set such that the voltages of the respective unit cells, which are leveled by the voltage leveling, are equal to each other within 0.001V.

The voltage leveling according to the present invention may be randomly performed during the manufacture or the use of the battery module. During the manufacture of the battery module, it is preferable that the voltage leveling be performed before the unit cells are connected in series with each other.

In accordance with yet another aspect of the present invention, there is provided a parallel connection apparatus for performing the above-described voltage leveling.

The parallel connection apparatus according to the present invention comprises a cathode terminal connection unit and an anode terminal connection unit, and each of the connection units has a plurality of connection members connected to cathode terminals and anode terminals of unit cells, the connection members being electrically connected with each other.

In a preferred embodiment of the present invention, the connection members are conductive members having a plate-shaped strip structure, the connection members are arranged in line while the connection members are electrically connected with each other, the connection members are attached to an insulating unit body of each of the connection units, and a wire, which serves as another connection member, is coupled to the insulating unit body of each of the connection units while the wire is electrically connected to the connection members.

The parallel connection apparatus is effectively used to level the voltage of a battery module having a plurality of unit cells sequentially stacked one on another. Electrode terminals of the stacked unit cells are arranged at regular intervals, and therefore, it is possible to connect connecting members having the same arrangement as the electrode terminals to the electrode terminals of the unit cells in one action.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
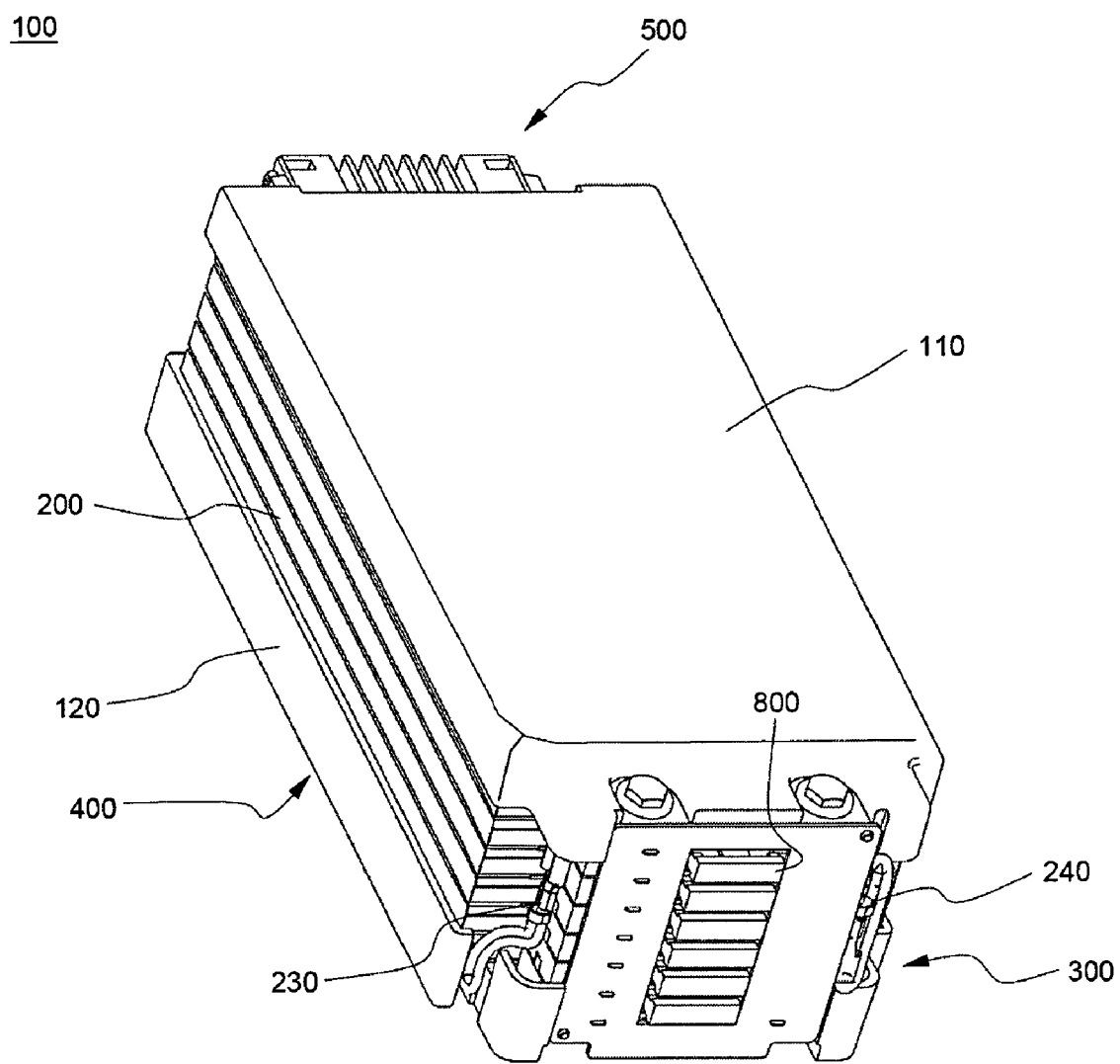
FIG. 1 is a perspective view illustrating a secondary battery module according to a preferred embodiment of the present invention, to which a separation-type connecting member according to the present invention is applied.

FIG. 1 is a perspective view illustrating a secondary battery module 100 according to a preferred embodiment of the present invention, to which a separation-type connecting member according to the present invention is applied.

Referring to FIG. 1, the battery module 100 includes an upper case 110, a lower case 120, a plurality of unit cells 200, a first circuit unit 130, a second circuit unit 140, and a third circuit unit 150. The unit cells 200 are stacked between the upper case 110 and the lower case 120, which are separated from each other. The first circuit unit 130 is mounted at the front surface of the battery module 100, the second circuit unit 140 is mounted at the lower surface of the battery module 100, and the third circuit unit 150 is mounted at the rear surface of the battery module 100.

Since the upper case 110 and the lower case 120 are separated from each other, the number of the unit cells 200, which are stackable one on another, is not limited by the upper case 110 and the lower case 120. Consequently, it is possible to easily design the battery module 100, such that the battery module 100 has desired electrical capacity and output, by modifying the first circuit unit 130 and the third circuit unit 150 depending upon the number of the stacked unit cells 200. Also, the unit cells 200 are exposed, and therefore, heat dissipation is efficiently accomplished while the unit cells 200 are charged or discharged. According to an embodiment, the upper case 110 may be omitted.

The first circuit unit 130 is mounted at one side surface of the battery module 100 adjacent to electrode terminals of the unit cells 200. The first circuit unit 130 includes a connecting member according to the present invention for connecting the unit cells 200 in parallel or in series with each other and a sensing board assembly for sensing voltage and/or current signals of the respective unit cells 200.

The second circuit unit 140 is electrically connected to the first circuit unit 130. The second circuit unit 140 includes a main board assembly for controlling the battery module 100. The main board assembly is mounted in a lower receiving part of the lower case 120. The temperature of the battery may be sensed by the main board assembly.

The third circuit unit 150 is electrically connected to the second circuit unit 140. Also, the third circuit unit 150 is connected to an external input/output terminal while preventing overcurrent during charging and discharging of electricity. The third circuit unit 150 is mounted at the other side surface of the battery module 100 such that the third circuit unit 150 is opposite to the first circuit unit 130.

According to an embodiment, the first circuit unit 130, the second circuit unit 140, and the third circuit unit 150 may be constructed partially or wholly in a combined structure. Also, these circuit units 130, 140, and 150 may be mounted partially or wholly at the same position of the battery module, i.e., one or two surfaces of the battery module. These constructions of the circuit units must be interpreted to be within the scope of the present invention.

Figure 2:
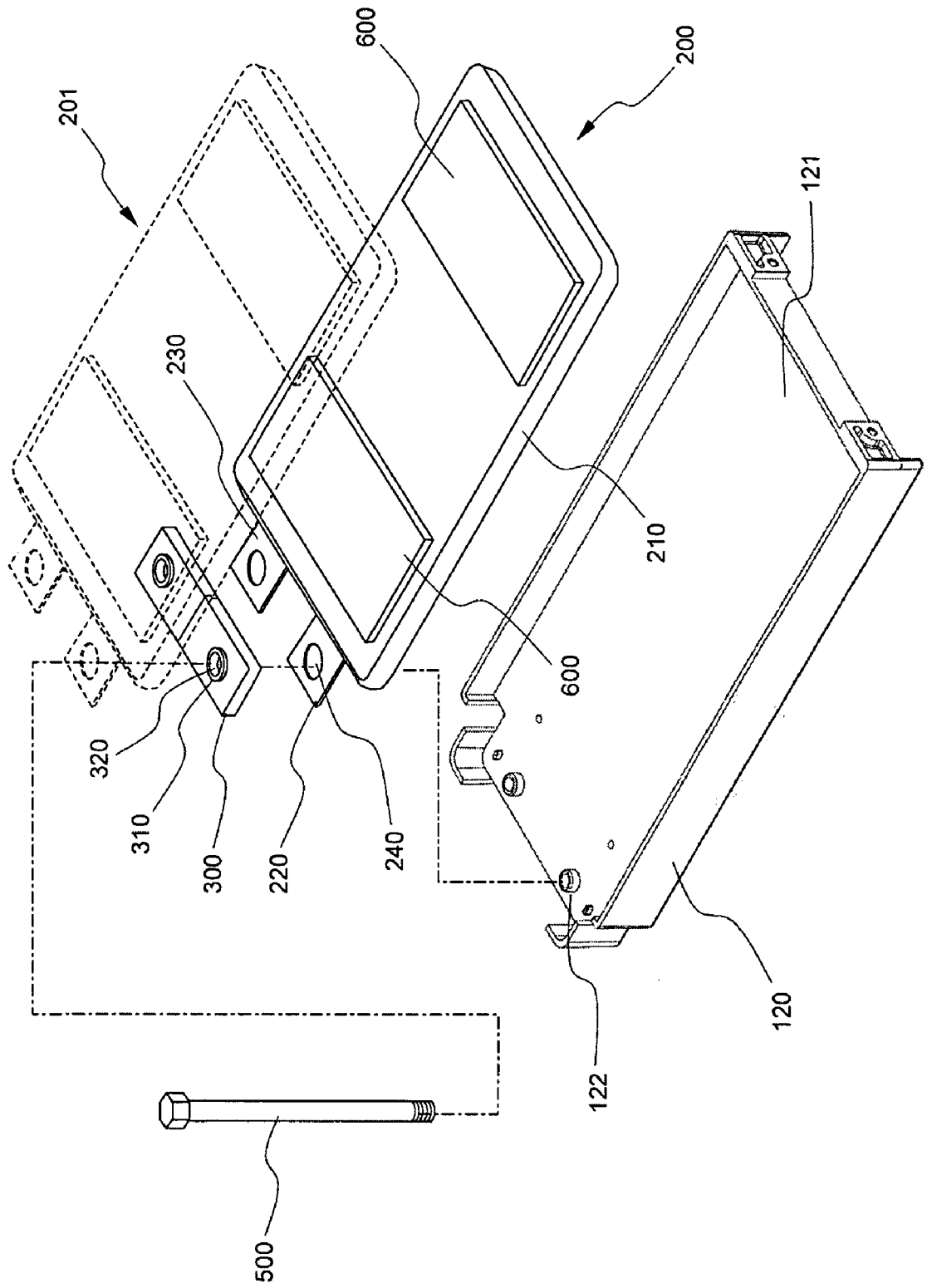
FIG. 2 is a typical view illustrating stacking of unit cells on a lower case of the battery module shown in FIG. 1.

FIG. 2 is a typical view illustrating stacking of the unit cells on the lower case of the battery module shown in FIG. 1.

Referring to FIG. 2, the lower case 120 is a rectangular structure almost corresponding to the outer appearance of the unit cell 200. The lower case 120 includes an upper receiving part 121, in which the unit cell 200 is received. According to an embodiment, the lower case 120 may be a simple plate structure. Preferably, the lower case 120 is made of a plastic resin, such as acrylonitrile-butadiene-styrene (ABS), polycarbonate (PC), or polybutylene terephthalate (PBT), which has high strength and provides electrical insulation.

The unit cell 200 stacked on the lower case 120 is a pouch-shaped secondary cell, which has a cathode terminal 220 and an anode terminal 230 protruding from the upper end of a cell body 210. At the electrode terminals 220 and 230 are formed with though-holes 240, respectively. Additional fixing members, for example, fasteners 500, are inserted through the through-holes 240 and fixing holes 122 formed in the lower case 120, with the unit cells 200 and 201 stacked, and then nuts (not shown) are fitted on the fasteners 500 at the lower surface of the lower case 120. Consequently, the unit cells 200 and 201 are fixed to each other.

Mounted between the electrode terminals 220 and 230 of the unit cells 200 and the electrode terminals 220 and 230 of the unit cells 201 is an insulating member 300 for accomplishing the electrical insulation between the unit cells 200 and 201. Formed at the insulating member 300 are protrusions 310, which are fitted into the though-holes 240 of the electrode terminals 220 and 230. Also formed at the protrusions 310 are through-holes 320, and therefore, the electrical insulation between the fasteners 500 inserted through the through holes 320 of the protrusions 310 and the electrode terminals 220 and 230 is maintained.

Also, two double-sided adhesive tapes 600 are attached to the cell body 210 of the unit cell 200, whereby more stable coupling between the stacked unit cells 200 and 201 is guaranteed. Furthermore, the stacked unit cells 200 and 201 are spaced apart from each other by the thickness of the double-sided adhesive tapes 600. The gap between the stacked unit cells 200 and 201 serves to accommodate a change in the volume of the unit cells 200 and 201 while the unit cells 200 and 201 are charged or discharged and to effectively dissipate heat generated from the unit cells 200 and 201 while the unit cells 200 and 201 are charged or discharged.

Figure 3:
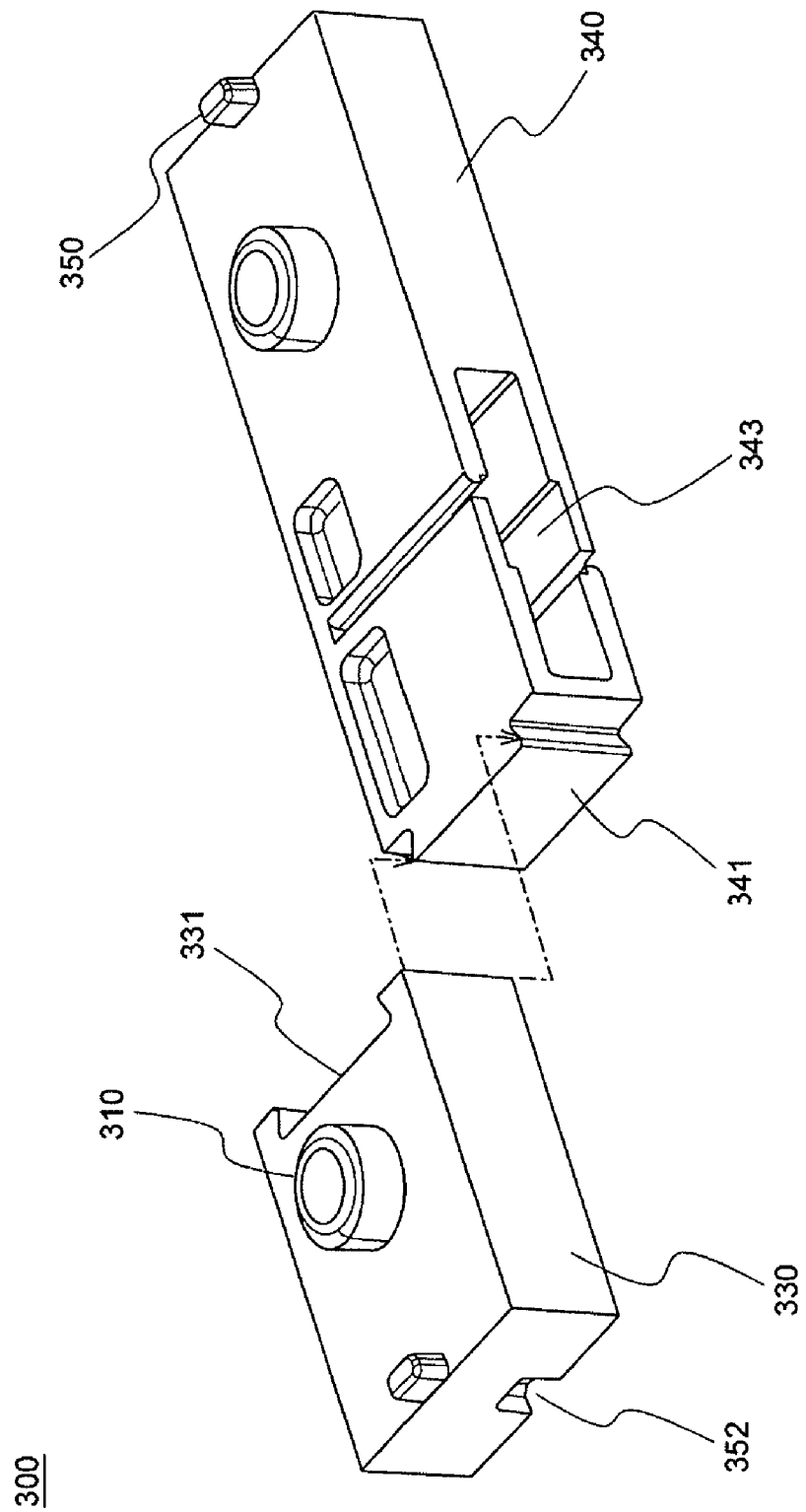
FIG. 3 is a typical view illustrating an assembly-type insulating member according to a preferred embodiment of the present invention, to which the separation-type connecting member according to the present invention is coupled, before assembling the insulating member.

FIG. 3 is a typical view illustrating an assembly-type insulating member according to a preferred embodiment of the present invention, to which the separation-type connecting member according to the present invention is coupled, before assembling the insulating member.

Referring to FIG. 3, the insulating member 300 comprises: a first assembly unit body 330 having a female coupling part 331 formed at one side thereof, and a second assembly unit body 340 having a male coupling part 341 formed at one side thereof such that the male coupling part 341 corresponds to the female coupling part 331. The first assembly unit body 330 and the second assembly unit body 340 are coupled with or separated from each other. The insulating member 300 is constructed to have the shape of a rectangular block when the first assembly unit body 330 and the second assembly unit body 340 are coupled with each other.

Formed at the opposite sides on top of the respective assembly unit bodies 330 and 340 are coupling protrusions 350, by which the assembly unit bodies 330 and 340 are coupled with another insulating member (not shown) stacked on the assembly unit bodies 330 and 340. Formed at the bottom surfaces of the assembly unit bodies 330 and 340 are coupling grooves 352, which correspond to the coupling protrusions 350. Also, the protrusions 310 are formed at the middle parts of the upper surfaces of the respective assembly unit bodies 330 and 340 such that the protrusions 310 are fitted in the though-holes (not shown) of the electrode terminals of the unit cell, as shown in FIG. 2.

Formed at the side of the second assembly unit body 340 is a hollow part 343, by which a connecting member (not shown) is coupled with the insulating member 300 constructed by coupling the first assembly unit body 330 and the second assembly unit body 340.

Figure 4:
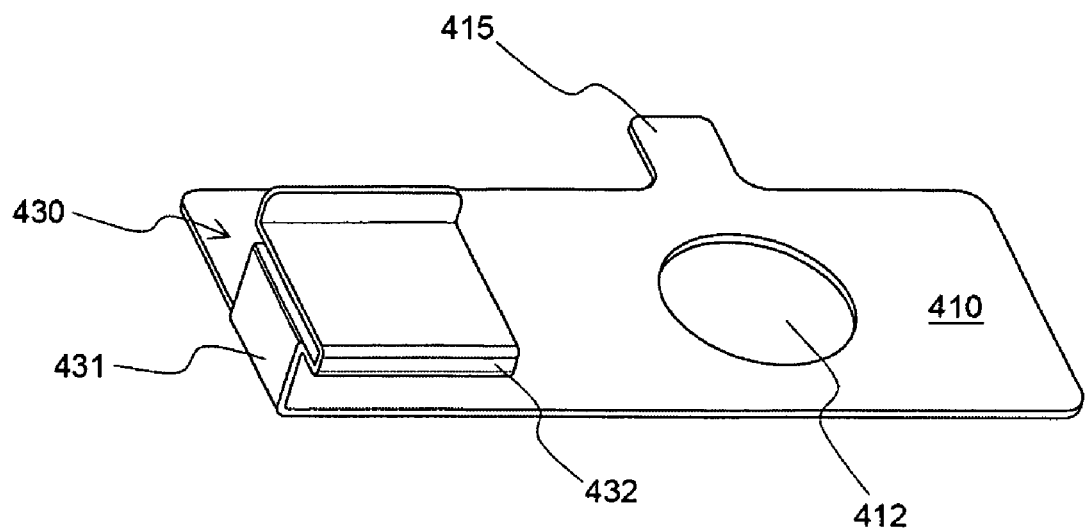
FIG. 4 is a typical view illustrating a separation-type connecting member according to a preferred embodiment of the present invention.
Figure 4:
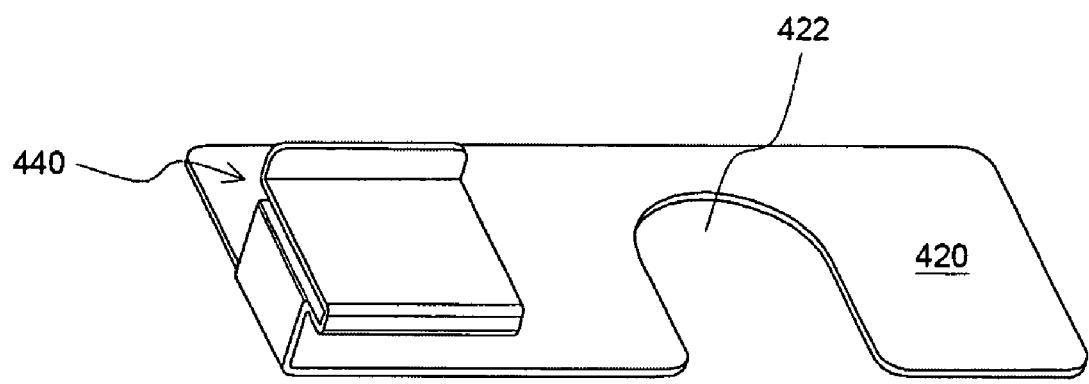

FIG. 4 is a typical view illustrating a separation-type connecting member according to a preferred embodiment of the present invention.

Referring to FIG. 4, the separation-type connecting member 400 comprises: a first terminal connecting body 410, which is connected to one of the electrode terminals of the unit cell (for example, the cathode terminal); and a second terminal connecting body 420, which is connected to the other electrode terminal of the unit cell (for example, the anode terminal). The terminal connecting bodies 410 and 420 are made of a conductive material and formed in the shape of a plate. Formed at the respective terminal connecting bodies 410 and 420 are engaging grooves 412 and 422, into which the protrusions 310 of the insulating member (see FIG. 3) are fitted. The engaging groove 412 formed at the first terminal connecting body 410 is constructed in a closed type such that the corresponding protrusion of the insulating member is fitted into the engaging groove 412 of the first terminal connecting body 410 only from above. On the other hand, the engaging groove 422 formed at the second terminal connecting body 420 is constructed in an open type such that the corresponding protrusion of the insulating member is fitted into the engaging groove 422 of the second terminal connecting body 410 from both above and side. A process of assembling the insulating member and the connecting member will be described hereinafter with reference to FIG. 5.

Formed at the first terminal connecting body 410 is a connecting extension part 415, which protrudes from the side thereof such that the connecting extension part 415 can be connected to the sensing board assembly in the assembled state.

Formed at the respective terminal connecting bodies 410 and 420 are engaging parts 430 and 440, respectively, which are securely inserted into the hollow part 343 of the insulating member (see FIG. 3). Each of the engaging parts 430 and 440 includes a first bent section 431 formed by bending inwardly a main body, which is made of a plate-shaped material, at a predetermined height, and a second bent section 432 formed by vertically bending the first bent section 431. Consequently, the engaging parts 430 and 440 can be elastically engaged in the hollow part of the insulating member.

Figure 5:
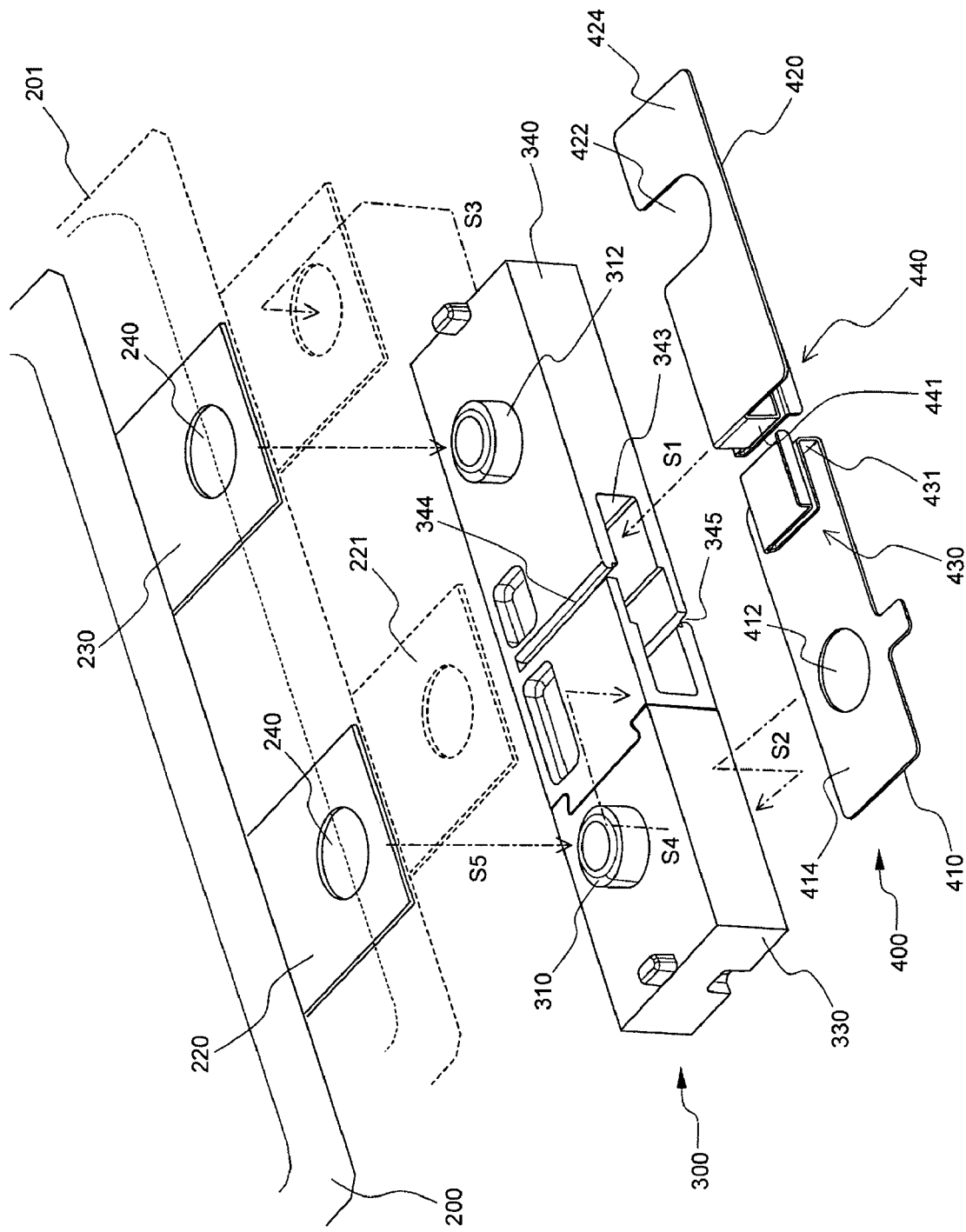
FIG. 5 is a typical view partially illustrating the connection of electrode terminals using the assembly-type insulating member shown in FIG. 3 and the separation-type connecting member shown in FIG. 4.

FIG. 5 is a typical view partially illustrating the connection of the electrode terminals of the unit cells using the assembly-type insulating member shown in FIG. 3 and the separation-type connecting member according to the preferred embodiment of the present invention shown in FIG. 4. Specifically, the connection of the unit cells 200 and 201 in series using the insulating member 300 and the connecting member 400 is illustrated in FIG. 5.

Referring to FIG. 5, the engaging parts 430 and 440 of the first and second terminal connecting bodies 410 and 420 of the connecting member are securely inserted into the hollow part 343 of the second assembly unit body 340 of the insulating member. Specifically, the engaging part 430 of the first terminal connecting body 410 is inserted into the hollow part 343 with the engaging part 430 directed upward, and the plate-shaped main body 414 covers the lower end surfaces of the first assembly unit body 330 and the second assembly unit body 340. When the first terminal connecting body 410 is coupled to the insulating member as described above, the side bent section 431 of the engaging part 430 is moved inward along a lower guide groove 345 formed with a predetermined length at the lower end of the hollow part 343. When the engaging part 430 of the first terminal connecting body 410 is inserted into the hollow part 343 of the insulating member 300, the first terminal connecting body 410 is mounted at the lower end surface of another insulating member (not shown) having no projections. For this reason, the engaging groove 412 is formed in the closed type.

On the other hand, the engaging part 440 of the second terminal connecting body 420 is inserted into the hollow part 343 with the engaging part 440 directed downward, and the plate-shaped main body 424 covers the upper end surface of the second assembly unit body 340. When the second terminal connecting body 420 is coupled to the insulating member as described above, the side bent section 441 of the engaging part 440 is moved inward along an upper guide groove 344 formed with a predetermined length at the upper end of the hollow part 343. When the engaging part 440 of the second terminal connecting body 420 is inserted into the hollow part 343 of the insulating member 300, the second terminal connecting body 420 is mounted at the upper end surface of the insulating member 300 having the protrusions 312. For this reason, the engaging groove 422 is formed in the open type.

The two terminal connecting bodies 410 and 420 remain separated from each other as shown in the drawing (showing the state before the coupling) even after the terminal connecting bodies 410 and 420 are coupled to the insulating member 300. The first terminal connecting body 410 is connected to a cathode terminal 221 of the unit cell 201 coupled to the lower end surface of the first assembly unit body 330, and the second terminal connecting body 420 is connected to an anode terminal 230 of the unit cell 200 coupled to the protrusion 312 of the second assembly unit body 340.

Now, the process of assembling the insulating member and the connecting member will be described.

First, the second terminal connecting body 420 is coupled to the second assembly unit body 340 (S1). Next, the first terminal connecting body 410 is coupled to the insulating member 300 (S2). Subsequently, the engaging groove 422 of the second terminal connecting body 420 coupled to the second assembly unit body 340 as described above is aligned with the through-hole 240 of the anode terminal 230 of the unit cell 200 (S3). After that, the first assembly unit body 330 is coupled to the second assembly unit body 340 (S4). Finally, the unit cell 200 is mounted at the insulating member 300 such that the protrusion 310 is fitted in the though-hole 240 of the cathode terminal 220, and the protrusion 312 is fitted in the through-hole 240 of the anode terminal 230 (S5). At this time, the cathode terminal 220 is brought into contact with another first terminal connecting body (not shown) to be coupled from above while the cathode terminal 220 is coupled to the protrusion 310. On the other hand, the anode terminal 230 is brought into contact with the second terminal connecting body 420, which is coupled to the protrusion 312.

The above-described assembly process is merely an example of a possible assembly process, and the sequence of the assembly process may be partially changed. For example, the step of coupling the first assembly unit body 330 and the second assembly unit body 340 (S4) may be carried out first.

As described above, the electrode terminals 220 and 230 are not electrically connected with each other while the terminal connecting bodies 410 and 420 of the connecting member 400 are connected to the electrode terminals 220 and 230, respectively. Consequently, a risk of short-circuits is greatly reduced while the battery module is assembled.

Figure 6:
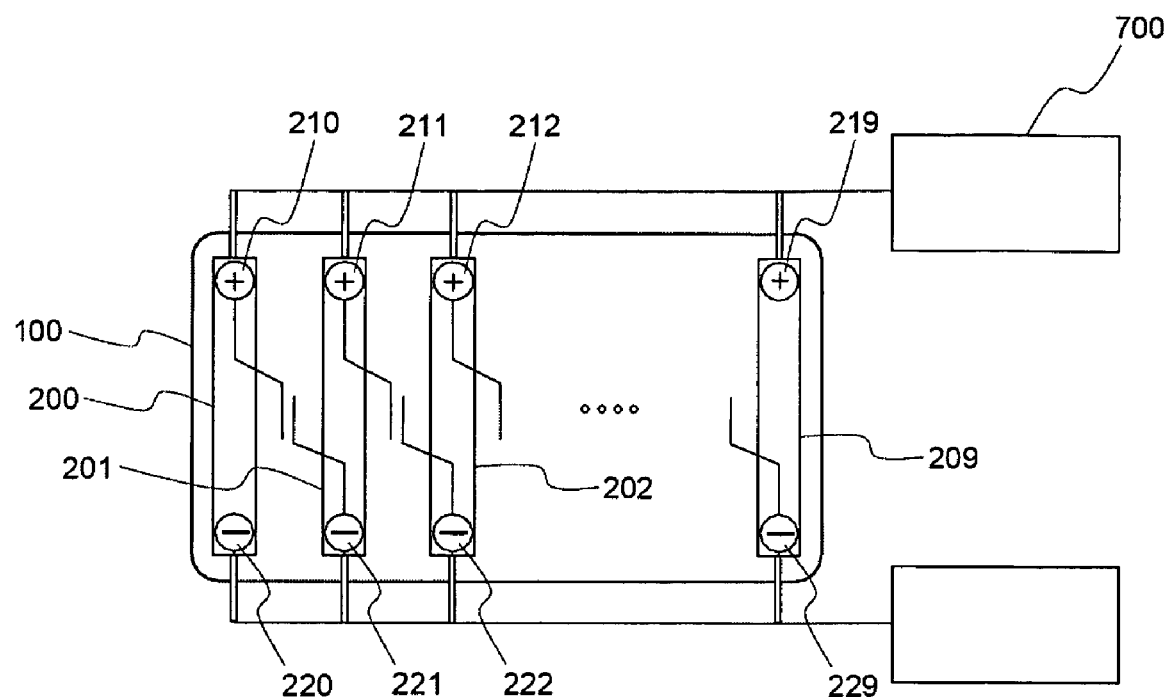
FIG. 6 is a view illustrating a structure for leveling the voltage of unit cells of a battery module according to the present invention.

The battery module assembled as shown in FIG. 5 has a circuit structure as shown in FIG. 6.

Referring to FIG. 6, the battery module 100 includes a plurality of unit cells 200, 201, 202 . . . 209, which can be charged and discharged. The unit cells 200, 201, 202 . . . 209 are connected in series with each other to provide high output. As shown in FIG. 6, the electrical connection between the unit cells 200, 201, 202 . . . 209 is released to perform voltage leveling. While the electrical connection between the unit cells is released, cathode terminals 210, 211, 212 . . . 219 of the unit cells 200, 201, 202 . . . 209 are connected in parallel with each other, and anode terminals 220, 221, 222 . . . 229 of the unit cells 200, 201, 202 . . . 209 are also connected in parallel with each other, using a parallel connection apparatus 700, to perform the voltage leveling.

Figure 7:
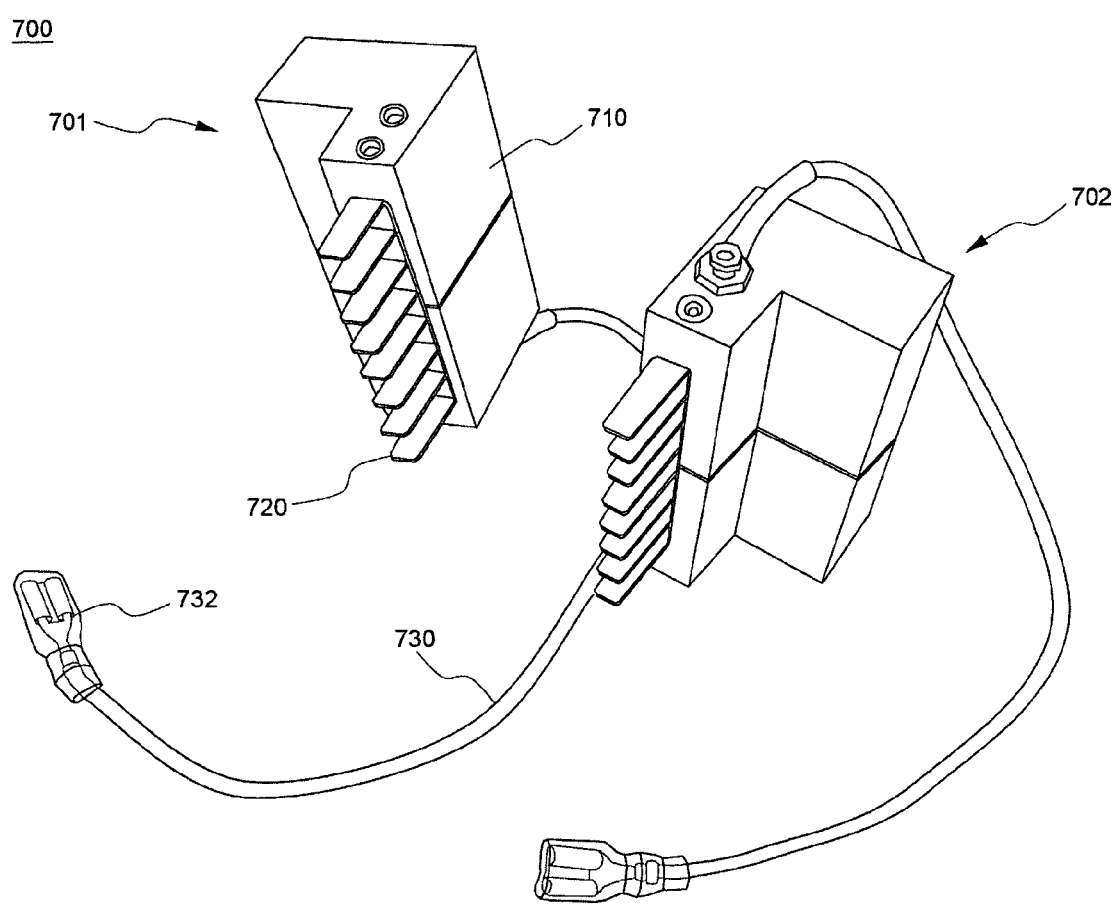
FIG. 7 is a perspective view illustrating a voltage leveling-purpose parallel connection apparatus according to a preferred embodiment of the present invention.

FIG. 7 is a perspective view illustrating a voltage leveling-purpose parallel connection apparatus 700 according to a preferred embodiment of the present invention.

Referring to FIG. 7, the voltage leveling-purpose parallel connection apparatus 700 comprises a cathode terminal connection unit 701 and an anode terminal connection unit 702. The two connection units 701 and 702 are constructed approximately in the same shape. Each connection unit has a plurality of connection members 720 attached to a unit body 710 thereof. To each unit body 710 is connected a wire 730. The connection members 720 have a plate-shaped strip structure. The connection members 720 are arranged at regular intervals. The connection members 720 are electrically connected with each other. Each wire 730 is provided at one end thereof with a connection cord 732. The other end of the wire 730 is connected to the corresponding unit body 710. The wire 730 is also electrically connected to the connection members 720. The cathode terminal connection unit 701 and the anode terminal connection unit 702 may be separately manufactured, in a similar manner as shown in FIG. 3. According to an embodiment, however, the cathode terminal connection unit 701 and the anode terminal connection unit 702 may be manufactured such that cathode terminal connection unit 701 and the anode terminal connection unit 702 can be separated from or assembled with each other. Alternatively, the cathode terminal connection unit 701 and the anode terminal connection unit 702 may be manufactured in a single body. In any cases, cathode terminal connection parts and anode terminal connection parts of the voltage leveling-purpose parallel connection apparatus remain electrically insulated.

Figure 8:
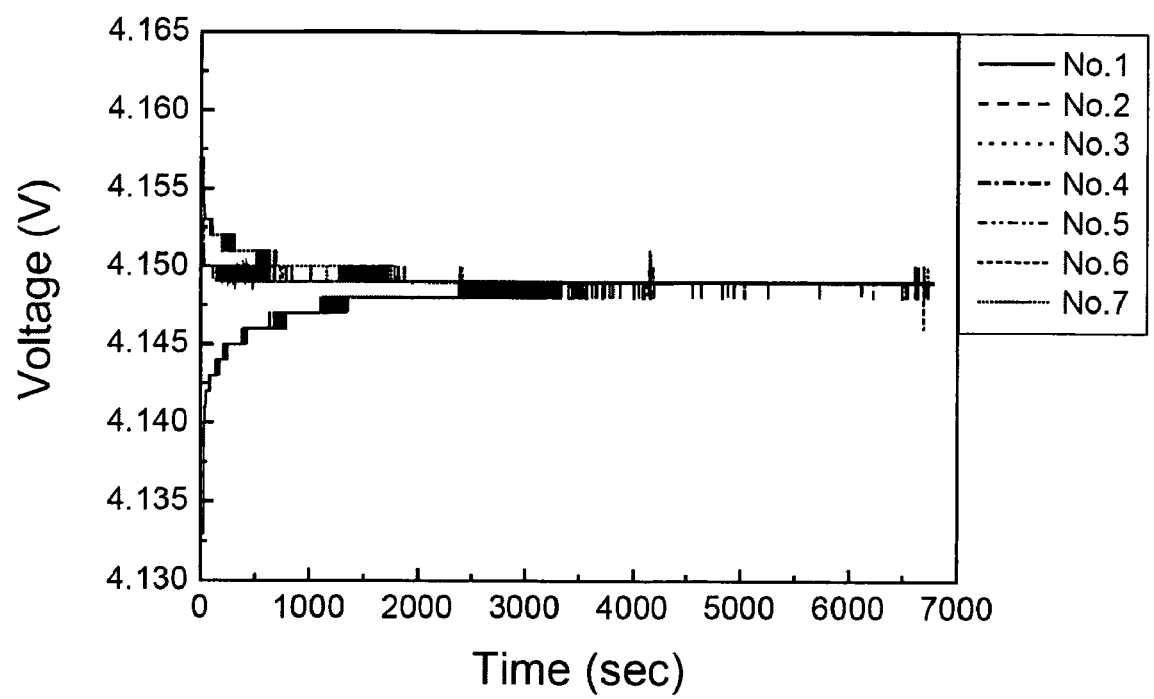
FIG. 8 is a graph illustrating the results of voltage leveling tests of seven unit cells according to the present invention.

FIG. 8 is a graph illustrating the results of voltage leveling tests of the unit cells, which are carried out as described above.

Seven unit cells were connected in parallel with each other for approximately 7000 seconds to perform the voltage leveling. The unit cells to be tested were randomly selected from a plurality of lithium secondary cells (LG Chem, Ltd: E1™). It can be seen from the graph of FIG. 8 that most of the unit cells had initial voltages, which were from 4.150V to 4.160V while some of the unit cells had initial voltages, which were from 4.130V to 4.140V. Therefore, the maximum voltage difference between the unit cells was approximately 0.030V. Some time after the parallel-type voltage leveling according to the present invention was performed, the voltages of the respective unit cells reached approximately 4.147 to 4.148V, which was the leveled voltage. Consequently, when all of the unit cells are adjusted to the leveled voltage over some period of time, and then the unit cells are connected in series with each other, the unit cells are electrically connected with each other in the optimal battery module operation state.

Figure 9:
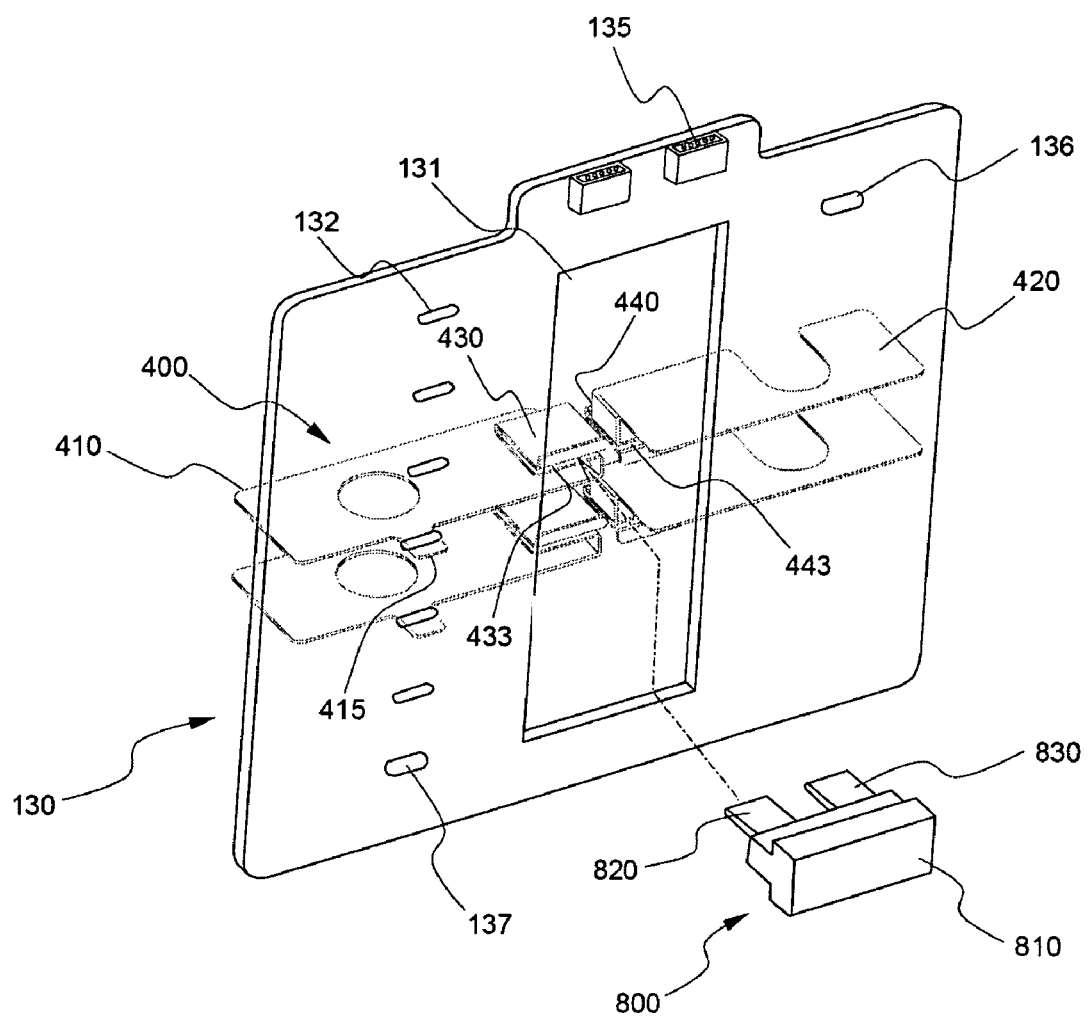
FIG. 9 is a perspective view illustrating the connection of a fuse to each separation-type connecting member of FIG. 4, which is coupled to a sensing board assembly of the battery module.

FIG. 9 is a perspective view illustrating the connection of a fuse to each separation-type connecting member, after the above-described voltage leveling process is completed, such that the terminal connecting bodies of the connecting member are electrically connected with each other. For the convenience of understanding, only the connecting members, by which the electrode terminals of the unit cells are connected with each other, are partially indicated with an imaginary line. A printed circuit board of FIG. 9 is one of the components constituting the first circuit unit shown in FIG. 1. For the convenience of description, the printed circuit board will be indicated hereinafter by reference numeral 130.

The printed circuit board 130 is a rectangular plate-shaped member. A wide opening 131 is formed at the center of the printed circuit board 130, and a plurality of drilled-holes 132 are formed through the printed circuit board 130 at one side of the wide opening 131. Connected to the respective drilled-holes 132 are circuits (not shown), which are printed on a board body 133 of the printed circuit board 130. The circuits are connected to sockets 135, which are formed at one end portion of the board body 133. The number of the sockets 135 may be appropriately decided depending upon the number of the circuits connected to the sockets 135. Formed at the left upper end and the right lower end of the board body 133 are relatively large drilled-holes 136 and 137, respectively, to which final cathode and anode terminals are connected when unit cells (not shown) are connected in series with each other. Specifically, final cathode and anode wires, which are used for the electrical connection between the unit cells connected in series with each other, are connected through the drilled-holes 136 and 137.

The opening 131 is provided to expose the connected regions of the electrode terminals of the unit cells, which are located in the opposite side to the board body 133. While the printed circuit board 130 is mounted, a safety element, such as a fuse, a bimetal, or a positive temperature coefficient (PTC) element, may be mounted at the electrode terminals through the opening 131.

As described above with reference to FIG. 5, the connecting extension part 415 of each first terminal connecting body 410 is oriented toward the printed circuit board 130 while each connecting member is coupled to the corresponding insulating member. Since each first terminal connecting body 410 is stably fixed at the position corresponding to the electrode terminals of the unit cell, the connecting extension parts 415 are also located at their predetermined positions. Consequently, the printed circuit board 130 is placed on the connecting members 400 such that the connecting extension parts 415 can be inserted through the drilled-holes 132 of the printed circuit board 130, which is the first step of the assembling process. After the first step of the assembling process is completed, the tips of the connecting extension parts 415 protrude from the board body 134 through the drilled-holes 132. The protruding tips of the connecting extension parts 415 are soldered to accomplish the electrical connection and the physical coupling between the connecting members 400 and the printed circuit board 130.

Even after the coupling between the connecting members 400 and the printed circuit board 130 is accomplished, the first and second terminal connecting bodies 410 and 420 of the connecting members 400 remain separated from each other. This is, the first and second terminal connecting bodies 410 and 420 are not electrically connected with each other. Therefore, after the assembly of the relevant members is completed, it is necessary to connect the terminal connecting bodies 410 and 420 with a safety element or an additional conductive element such that the electrical conduction between the terminal connecting bodies 410 and 420 is allowed. FIG. 9 illustrates the electrical connection using a fuse 800, which is a kind of safety element, and FIG. 1 illustrates the whole structure of the battery module 100, the electrical connection of which is accomplished by the fuse.

Specifically, elastic connecting grooves 433 and 443 are formed at the engaging parts 430 and 440 of the first and second terminal connecting bodies 410 and 420 while the first terminal connecting body 410 and the second terminal connecting body 420 are coupled to the insulating member. The connecting terminals 820 and 830 of the fuse 800 are inserted into the connecting grooves 433 and 443 of the engaging parts 430 and 440, whereby the electrical connection between the first terminal connecting body 410 and the second terminal connecting body 420 is accomplished.

Consequently, the cathode terminal connection unit 701 and the anode terminal connection unit 702 of FIG. 7 are connected to the engaging parts 430 and 440 of the first and second terminal connecting bodies 410 and 420, respectively, while the fuses 800 are removed, in order to perform the voltage leveling. Specifically, the connection members 720 (see FIG. 7) having the plate-shaped strip structure, which are arranged in line, are inserted into the connecting grooves 433 and 443, and the connection cords 732 of the wires 730 are connected to the final electrode terminal connection parts 230 and 240 (see FIG. 1) of the battery module. Thus, the cathode terminals are connected in parallel with each other and the anode terminals are also connected in parallel with each other. The connection members 720 (see FIG. 7) having the plate-shaped strip structure are arranged at the same intervals as the first and second terminal connecting bodies 410 and 420 electrically connected to the cathode and anode terminals of the unit cells (not shown), respectively. Consequently, the connection is accomplished by the one-step mounting process. Subsequently, the wires 730 are connected to the final electrode terminal connection parts 230 and 240, so that the parallel connection is accomplished.

In the battery module 100 of FIG. 1, the electrode terminals of the unit cells 200 are electrically connected with each other by the fuses 800. When the voltage leveling is required during the use of the battery module 100, the fuses 800 are removed to release the electrical connection between the unit cells 200, and then the parallel connection apparatus 700 of FIG. 7 is connected to the battery module 100. Consequently, it is possible to perform the voltage leveling of the battery module 100 during the use of the battery module 100.

Although the preferred embodiments of the present invention have been disclosed for illustrative purposes, those skilled in the art will appreciate that various modifications, additions and substitutions can be made, without departing from the scope and spirit of the invention as defined by the appended claims.

INDUSTRIAL APPLICABILITY

As apparent from the above description, the first and second terminal connecting bodies constituting the separation-type connecting member for secondary battery modules according to the present invention are separated from each other even after the terminal connecting bodies are connected to the electrode terminals of the unit cells. Consequently, a risk of an engineer receiving an electric shock due to short circuits and a possibility of damage to the unit cells are greatly reduced during assembling of the secondary battery module. In addition, the mal-operation of the unit cells, which may cause the abnormal operation of the entire battery module, such as overcurrent and overheating, is interrupted by the safety elements provided for each unit cell. Also, the safety elements are easily checked and replaced.

Furthermore, the unit cells of the battery module including the above-described connecting members are connected in parallel with each other to perform the voltage leveling. Consequently, the voltage difference between the unit cells is minimized, and therefore, the battery module operates optimally. The voltage leveling can be randomly performed during the manufacturing of the battery module, specifically, before the electrode terminals are connected in series with each other, or during the use of the battery module.

The battery module according to the present invention can be utilized as a battery module for medium- or large-sized devices, such as electric bicycles, electric vehicles, and hybrid electric vehicles.

What is claimed is:

1. A connecting member used to electrically connect electrode terminals of unit cells constituting a secondary battery module with each other, the connecting member comprising:

a first terminal connecting body connected to the electrode terminal of one unit cell (a);

a second terminal connecting body connected to the electrode terminal of another unit cell (b); and an insulating member mounted between electrode terminals of the neighboring unit cells for accomplishing the electrical insulation between the electrode terminals, the insulating member being coupled to the electrode terminals, wherein the first terminal connecting body and the second terminal connecting body are separated from each other while the first terminal connecting body and the second terminal connecting body are connected to the corresponding electrode terminals, and the electrical connection between the unit cell (a) and the unit cell (b) is accomplished by coupling a conductive member to the first terminal connecting body and the second terminal connecting body, wherein the first and second terminal connecting bodies of the connecting member are electrically connected to the electrode terminals of the corresponding unit cells while the first and second terminal connecting bodies of the connecting member are coupled to the insulating member, wherein the insulating member comprises a first assembly unit body and a second assembly unit body constructed such that the assembly unit bodies can be coupled with or separated from each other, a cathode terminal of the unit cell being coupled to one of the assembly unit bodies while an anode terminal of the unit cell is coupled to the other assembly unit body, wherein the first assembly unit body has a female coupling part formed at one side thereof, and the second assembly unit body has a male coupling part formed at one side thereof, the male coupling part corresponding to the female coupling part, wherein the first and second assembly unit bodies are provided at the side parts of the upper ends thereof with coupling protrusions, by which the first and second assembly unit bodies are coupled with another insulating member stacked on the first and second assembly unit bodies while the first and second assembly unit bodies are provided at the lower end surfaces thereof with coupling grooves, which correspond to the coupling protrusions, and wherein the second assembly unit body is provided at the side thereof with a hollow part, by which the connecting member is coupled to the insulating member constituted by the coupled first and second assembly unit bodies.

2. The connecting member as set forth in claim 1, wherein the electrode terminals of the unit cells are provided with though-holes, and the insulating member is provided with coupling protrusions, which correspond to the through-holes, such that the coupling protrusions of the insulating member are fitted in the though-holes of the electrode terminals.

3. The connecting member as set forth in claim 1, wherein the first terminal connecting body and the second terminal connecting body of the connecting member is coupled to the insulating member in such a manner that the first terminal connecting body and the second terminal connecting body surround the insulating member, or the first terminal connecting body and the second terminal connecting body are inserted into engaging grooves formed at the insulating member.

4. The connecting member as set forth in claim 1,
wherein the first terminal connecting body and the second terminal connecting body of the connecting member have engaging parts, which are securely inserted into the hollow part of the insulating member, and
wherein each of the engaging parts includes: a first bent section formed by bending inwardly a main body, which is made of a plate-shaped material, at a predetermined height; and a second bent section formed by vertically bending the first bent section, whereby the engaging parts are elastically inserted into the hollow part of the insulating member.

5. The connecting member as set forth in claim 1, wherein the first terminal connecting body is provided at the side thereof with a connecting extension part.

6. The connecting member as set forth in claim 1, wherein the conductive member is a fuse, a bimetal, or a positive temperature coefficient (PTC) element.

7. A secondary battery module including a connecting member as set forth in claim 1.

8. A parallel connection apparatus for performing voltage leveling, the apparatus comprising:
a cathode terminal connection unit; and
an anode terminal connection unit, wherein
each of the connection units has a plurality of connection members connected to cathode terminals and anode terminals of unit cells, the connection members being electrically connected with each other,
wherein the parallel connection apparatus is used to level the voltage of a medium- or large-sized secondary battery module comprising:
a plurality of unit cells, which are chargeable and dischargeable secondary cells;
a rectangular lower case having a lower receiving part, to which a main board assembly is attached, and an upper receiving part, on which the unit cells are sequentially stacked one on another;
a rectangular upper case having a lower receiving part for covering the upper end of the unit cells stacked on the lower case;
a first circuit unit for performing the electrical connection between the stacked unit cells, the first circuit unit including a sensing board assembly for sensing the voltage, the current and/or the temperature of the battery;
a second circuit unit electrically connected to the first circuit unit, the second circuit unit including a main board assembly for controlling the battery module; and
a third circuit unit electrically connected to the second circuit unit, the third circuit unit having switching elements for controlling the operation of the battery when the abnormal operation of the battery including overcharge, overdischarge, overcurrent and overheating occurs.

9. The apparatus as set forth in claim 8, wherein the connection members are conductive members having a plate-shaped strip structure, the connection members are arranged in line while the connection members are electrically connected with each other, the connection members are attached to an insulating unit body of each of the connection units, and a wire, which serves as another connection member, is coupled to the insulating unit body of each of the connection units while the wire is electrically connected to the connection members.

10. The apparatus as set forth in claim 8,
wherein the first circuit unit has fuses, which are disposed at connection regions where the unit cells are electrically connected with each other, and
wherein the connection in parallel at the connection region is performed to level the voltage of the unit cells before the mounting of the fuses or after the removal of the fuses.

* * * * *